US008501825B2

(12) United States Patent
Collins et al.

(10) Patent No.: US 8,501,825 B2
(45) Date of Patent: Aug. 6, 2013

(54) FORMULATION AND METHOD FOR PREPARING GELS COMPRISING HYDROUS HAFNIUM OXIDE

(76) Inventors: Jack L. Collins, Knoxville, TN (US);
Rodney D. Hunt, Oak Ridge, TN (US);
Frederick C. Montgomery, Oak Ridge, TN (US)

(*) Notice: Subject to any disclaimer, the term of this patent is extended or adjusted under 35 U.S.C. 154(b) by 408 days.

(21) Appl. No.: 12/683,942

(22) Filed: Jan. 7, 2010

(65) Prior Publication Data

US 2011/0166017 A1  Jul. 7, 2011

(51) Int. Cl.
*C01G 27/02* (2006.01)
*B01J 20/02* (2006.01)
*B01J 37/30* (2006.01)

(52) U.S. Cl.
USPC ............. 516/99; 516/88; 516/89; 252/625; 252/634; 423/15; 423/81; 423/85; 423/608

(58) Field of Classification Search
USPC ...... 516/34, 98, 99, 101, 90, 89, 88; 252/625, 252/634, 635; 423/15, 81, 85, 608
See application file for complete search history.

(56) References Cited

U.S. PATENT DOCUMENTS

| | | | | |
|---|---|---|---|---|
| 3,057,678 | A | * | 10/1962 | Clearfield ............... 423/472 |
| 3,254,949 | A | * | 6/1966 | Clearfield ............... 423/608 |
| 3,728,421 | A | | 4/1973 | Noothout |
| 3,812,049 | A | * | 5/1974 | Noothout et al. ......... 252/635 |
| 4,397,778 | A | * | 8/1983 | Lloyd .................... 252/637 |
| 4,502,987 | A | * | 3/1985 | Lloyd et al. ............. 252/635 |
| 5,821,186 | A | | 10/1998 | Collins |
| 6,599,493 | B2 | | 7/2003 | Collins et al. |
| 6,602,919 | B1 | | 8/2003 | Collins |

OTHER PUBLICATIONS

Lewis, Richard J., Sr. (2002) Hawley's Condensed Chemical Dictionary (14th Edition), John Wiley & Sons, Online @ http://knovel.com/web/portal/browse/display?_EXT_KNOVEL_DISPLAY_bookid=704&VerticalID=0 , headword = acetylacetone, chelate, complexing agent, (Knovel Release Date: Sep. 4, 2003; downloaded Mar. 23, 2012), pp. 1.*
Collins et al., "Determination of Ideal Broth Formulations Needed to Prepare Hydrous Aluminum Oxide Microspheres via the Internal Gelation Process," ORNL/TM-2009/006, Feb. 1, 2009.
Collins et al., "Determination of Ideal Broth Formulations Needed to Prepare Hydrous Cerium Oxide Microspheres via the Internal Gelation Process," ORNL/TM-2009/007, Feb. 1, 2009.
Collins et al., "Determination of Ideal Broth Formulations Needed to Prepare Hydrous Hafnium Oxide Microspheres via the Internal Gelation Process," ORNL/TM-2009/008, Feb. 1, 2009.
Nomura et al., "Removal of Fluoride Ion from Wastewater by a Hydrous Cerium Oxide Adsorbent," in Emerging Technologies in Hazardous Waste Management, ACS Symposium Series 422, American Chemical Society, Washington, D.C., 1990, p. 157-172.
Egan et al., "Development and Testing of Inorganic Sorbents Made by the Internal Gelation Process for Radionuclide and Heavy Metal Separations," Task Summary prepared for the DOE Office of Science and Technology, Nov. 29, 1995.
Kumar et al., "Sol-Gel Synthesis of Simulated Inert Matrix Fuel: $ZrO_2$—$CeO_2$ Solid Solutions," in Inorganic Materials: Recent Advances, 2004*, p. 115-120.
Arima et al., "Application of Internal Gelation to Sol-gel Synthesis of Ceria-doped Zirconia Microspheres as Nuclear Fuel Analogous Materials," Journal of Alloys and Compounds, v. 394, 2005*, p. 271-276.

* cited by examiner

*Primary Examiner* — Daniel S Metzmaier

(57) ABSTRACT

Formulations useful for preparing hydrous hafnium oxide gels contain a metal salt including hafnium, an acid, an organic base, and a complexing agent. Methods for preparing gels containing hydrous hafnium oxide include heating a formulation to a temperature sufficient to induce gel formation, where the formulation contains a metal salt including hafnium, an acid, an organic base, and a complexing agent.

19 Claims, 8 Drawing Sheets

Complexation/decomplexation

Hydrolysis

HMTA protonation

HMTA decomposition

Complexation/decomplexation $$2CO(NH_2)_2 + Hf^{4+} \leftrightarrow Hf[CO(NH_2)_2]_2^{4+}$$

Hydrolysis $$Hf^{4+} + xH_2O \leftrightarrow Hf(OH)_4 \cdot y(H_2O)_9 + 4H^+ \text{ and}$$

$$HfO^{2+} + xH_2O \leftrightarrow HfO(OH)_2 \cdot y(H_2O)_9 + 2H^+$$

HMTA protonation $$(CH_2)_6N_4 + H^+ \leftrightarrow (CH_2)_6N_4 \cdot H^+$$

HMTA decomposition $$(CH_2)_6N_4 \cdot H^+ + 3H^+ + 6H_2O \leftrightarrow 4NH_4^+ + 6CH_2O$$

FIG. 1

FORMULATION AND METHOD FOR PREPARING GELS COMPRISING HYDROUS HAFNIUM OXIDE

GOVERNMENT SUPPORT

This invention was made with government support under Contract No. DE-AC05-00OR22725 awarded by the U.S. Department of Energy. The government has certain rights in the invention.

TECHNICAL FIELD

The present disclosure relates to formulations and methods for preparing hydrous metal oxide gels, and more particularly to formulations and methods for preparing hydrous hafnium oxide gels and spherules.

BACKGROUND

Hydrated oxides, acidic salts, and heteropoly acid salts of many metals (such as titanium, zirconium, hafnium, tin, aluminum, lead, cerium, tungsten, magnesium, manganese, etc.) are effective inorganic ion exchange materials. Inorganic ion exchangers are often stable in high radiation fields, and thus are particularly useful in the removal of radionuclides from waste streams. These inorganic ion exchangers typically have high selectivities and efficiencies for separating and removing fission products, actinides, and other elements from aqueous waste streams. Most of these materials are also compatible with matrices used for long term waste storage, such as in glass, phosphate, or grout. Certain metal oxides are known to be effective catalysts, such as in the photocatalytic decomposition of various hazardous organics. Also, many metal oxides are known to be effective getters for removing volatile fission products from off-gas streams.

Several inorganic exchangers and sorbents are commercially available as pure material in powder or granular form. However, these fine powders and granular particles are often not readily adaptable to continuous processing, such as in column chromatography. Moreover, they often have poor hydrodynamic properties. Some of these powders are fabricated into pellets by using binding materials; however, the binders can lessen the number of available exchange sites. The binders can also block pores and passageways to the exchange sites within the structures and can adversely affect the loading and kinetic behavior of the exchangers.

Another disadvantage of many of the powders, granular materials, and pellets is lack of sorbent reproducibility of the inorganic ion exchangers. These materials are prepared in batch processes in which chemical and physical gradients can occur that cause variances in the crystal morphology and compositions of the products. Also, the granular material may not be very stable and can powder or erode, causing problems in column operations. Additionally, organic binders, when used to make the pellets, are often not stable when exposed to high radiation doses.

Attempts have been made to remedy the problems associated with powders and particles by forming gel particles. There are a number of gel forming processes used in the preparation of inorganic sorbents, catalysts, ceramics, and getters. Common to all these processes is that the constituents of the processes need to be suitable for the bonding of colloidal particles into gel structures. The gels usually are hydrous metal oxides. These processes are generally identified as "sol-gel" processes and the chemistries are complex and path dependent. Typically, they are defined as external or internal gelation processes. In external gelation processes, gelation reactions involve mass transfer to a second phase or fluid. By comparison, there is little or no mass transfer in internal gelation processes.

One of the original external gel processes for the preparation of nuclear fuels was developed at Oak Ridge National Laboratories. It was based on the gelation of colloidal sol droplets by extracting the water from them in an immiscible alcohol. In other external gelation processes, droplets of solutions of organic polymers or sols were chemically gelled with ammonia, usually by mass transfer of the ammonia from a surrounding gas or solution.

Making silica-alumina gel as spheres is an example of one internal gelation process. Gel spheres were made by continuously mixing an acid solution of $AlCl_3$ or $Al_2(SO_4)_3$ with sodium silicate as drops into an immiscible organic medium. The aqueous droplets gelled while in the organic medium. The key to this process was the slow or delayed gelation of silica when the sodium silicate was acidified.

The most widely studied internal gelation processes in recent years involves the water hydrolysis of metal alkoxides. In these processes, solution temperature and pH are key parameters used in controlling hydrolysis and polymerization. However, materials made by the metal alkoxide processes typically are fine powders. Additionally, due to the complex chemistries involved and the difficulty in operating the process, it is difficult to form gel-spheres of hydrous metal oxides wherein the reaction can be controlled and the final product made predictably.

SUMMARY

Disclosed herein are formulations and methods of forming hydrous metal oxide gels, specifically hydrous hafnium oxide gels, wherein the characteristics of the gel may be controlled to provide a gel which is useful for a variety of different applications, such as in inorganic ion exchange applications.

In one embodiment, formulations include a metal salt including hafnium, a source of hydrogen ions, an organic base, and a complexing agent. An acid is the source of the hydrogen ions. The formulation has a mole ratio of the organic base to the hafnium of at least about 1.2.

In another embodiment, formulations include a metal salt including hafnium, a source of hydrogen ions, an organic base, and a complexing agent. An acid is the source of the hydrogen ions. The formulation has a concentration of the hafnium that ranges from about 0.4 M to about 0.8 M.

In another embodiment, a method of preparing gels containing hydrous hafnium oxide includes heating a volume of a formulation to a temperature sufficient to induce gel formation, wherein the formulation contains a metal salt including hafnium, a source of hydrogen ions, an organic base, and a complexing agent. The formulation has a mole ratio of the organic base to the hafnium of at least about 1.2.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being FIG. 1 shows an internal gelation process.

DETAILED DESCRIPTION

Figure 2:
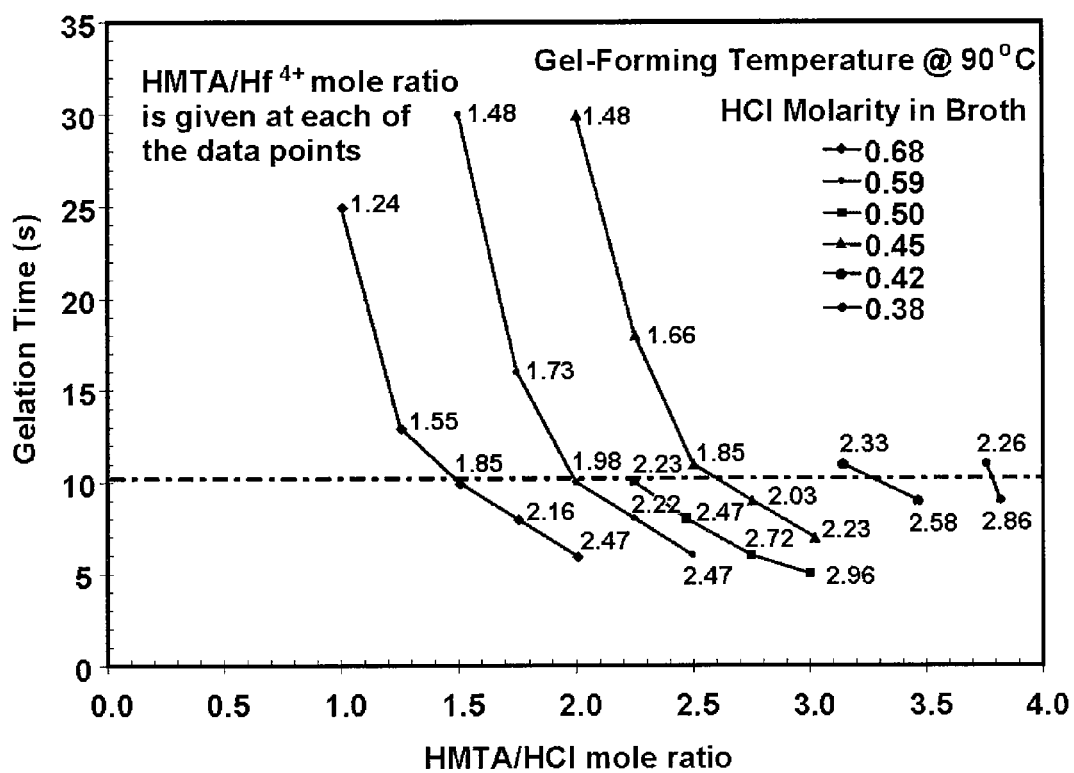
FIG. 2 illustrates gelation time as a function of HMTA/HCl mole ratio.

The present disclosure relates to formulations and processes to prepare hydrous hafnium oxide gels. To prepare hydrous hafnium oxide gels, solutions can be prepared which comprise a hafnium metal salt, an acid, an organic base, and a complexing agent. These solutions may be referred to as "broth solutions." The concentrations of the constituents of the broth solution may be optimized to form stable broth solutions that can be used in a gel-forming operation to form hydrous hafnium oxide gels of preferred shape, size, hardness, and composition. The temperature and time of gelation may also be optimized to form hafnium oxide gels of preferred specifications.

Generally, a broth solution can be prepared by combining a first stock solution and a second stock solution. The first stock solution comprises an organic base and a complexing agent. The second stock solution comprises a hafnium metal salt and an acid. Preferably, each stock solution is cooled to less than about 10° Celsius, and more preferably to about 0° Celsius prior to combining. Then, when the two stock solutions are mixed, the final broth is chilled to less than approximately 10° Celsius. Preferably, broth solutions prepared are stable for a reasonable period of time at ice bath temperatures near 0° Celsius. A stable broth solution is one that remains clear and does not gel or precipitate for reasonable periods ($\geqq 1$ hour) preferably at a temperature of 10° Celsius or less. Table 1 illustrates concentrations and mole ratios for exemplary stable broth solutions; the concentrations of hydrogen ion refer only to the hydrogen ions from the acid used to prepare the broth. Broth solutions that are stable for $\geqq 1$ hour are desirable for large scale preparations. However, broth solutions that gel in less than 1 hour can be used if, for example, the first stock solution and the second stock solution are pumped from separate containers into a mixing device prior to placement in a gel-forming operation.

TABLE 1

| HMTA/H+ (mole ratio) | HMTA/Hf$^{4+}$ (mole ratio) | HMTA (M) | urea (M) | Hf$^{4+}$ (M) | H$^+$ (M) | pH[1] |
|---|---|---|---|---|---|---|
| 1.00 | 1.24 | 0.68 | 0.68 | 0.55 | 0.68 | |
| 1.00 | 1.24 | 0.87 | 0.87 | 0.70 | 0.88 | |
| 1.25 | 1.55 | 0.85 | 0.85 | 0.55 | 0.68 | 0.9 |
| 1.25 | 1.54 | 1.02 | 1.02 | 0.66 | 0.81 | |
| 1.50 | 1.48 | 0.89 | 0.89 | 0.60 | 0.59 | |
| 1.50 | 1.85 | 1.11 | 1.11 | 0.55 | 0.68 | 1.2 |
| 1.50 | 1.84 | 1.14 | 1.14 | 0.62 | 0.76 | |
| 1.58 | 1.98 | 1.18 | 1.18 | 0.61 | 0.75 | |
| 1.75 | 2.16 | 1.19 | 1.19 | 0.55 | 0.68 | 1.6 |
| 1.75 | 2.17 | 1.26 | 1.26 | 0.58 | 0.72 | |
| 2.00 | 2.47 | 1.36 | 1.36 | 0.55 | 0.68 | 1.9 |
| 2.00 | 1.98 | 1.20 | 1.20 | 0.60 | 0.59 | |
| 2.07 | 2.07 | 1.23 | 1.23 | 0.60 | 0.60 | |
| 2.50 | 2.47 | 1.48 | 1.48 | 0.60 | 0.59 | |
| 2.50 | 1.85 | 1.13 | 1.13 | 0.61 | 0.45 | 0.5 |
| 2.49 | 1.86 | 1.17 | 1.17 | 0.63 | 0.47 | 0.6 |
| 3.02 | 2.16 | 1.33 | 1.33 | 0.61 | 0.45 | |
| 2.75 | 2.30 | 1.24 | 1.24 | 0.61 | 0.45 | 0.7 |
| 2.75 | 2.74 | 1.37 | 1.37 | 0.50 | 0.50 | |
| 2.23 | 2.23 | 1.12 | 1.12 | 0.50 | 0.50 | 1.0 |
| 2.25 | 2.23 | 1.27 | 1.27 | 0.57 | 0.57 | |
| 2.50 | 2.49 | 1.24 | 1.24 | 0.50 | 0.50 | |
| 2.50 | 2.45 | 1.35 | 1.35 | 0.55 | 0.54 | |
| 2.47 | 2.47 | 1.22 | 1.22 | 0.50 | 0.50 | 1.2 |
| 2.72 | 2.72 | 1.36 | 1.36 | 0.50 | 0.50 | 1.7 |
| 2.75 | 2.74 | 1.37 | 1.37 | 0.50 | 0.50 | |
| 2.75 | 2.75 | 1.43 | 1.43 | 0.52 | 0.50 | |
| 2.96 | 2.96 | 1.48 | 1.48 | 0.50 | 0.50 | 2.1 |
| 2.92 | 2.10 | 1.30 | 1.30 | 0.62 | 0.45 | |
| 3.02 | 2.23 | 1.36 | 1.36 | 0.61 | 0.45 | |
| 3.22 | 2.33 | 1.35 | 1.35 | 0.58 | 0.42 | |
| 3.21 | 2.30 | 1.37 | 1.37 | 0.60 | 0.43 | |
| 3.46 | 2.58 | 1.43 | 1.43 | 0.55 | 0.41 | |
| 3.77 | 2.26 | 1.35 | 1.35 | 0.60 | 0.36 | |
| 3.83 | 2.86 | 1.51 | 1.51 | 0.53 | 0.40 | |
| 4.16 | 2.50 | 1.43 | 1.43 | 0.57 | 0.34 | |
| 4.85 | 2.92 | 1.59 | 1.59 | 0.55 | 0.33 | |

[1]pH of chilled clear gel-free broth.

Preferably, the organic base is hexamethylenetetramine (HMTA) and the complexing agent is urea. More preferably, the organic base is pure crystalline HMTA, rather than the more commonly used free flowing form. The free flowing form of HMTA contains additives that can be detrimental to the gelation process. Preferably, deionized water is used to prepare the first stock solution.

Hafnium metal salts that can be used include hafnium metal salts that are soluble and which can provide a sufficient hafnium ion concentration in aqueous solution. The hafnium metal salt is preferably hafnium tetrachloride. Preferably, acidified water is used to prepare the stock solution. The acidity of the diluent suppresses premature hydrolysis of the hafnium. Generally, any acid may be used to acidify the water, preferably hydrochloric acid, nitric acid, sulfuric acid, or phosphoric acid. However, in general, the acid selected is dependent on the hafnium metal salt used, such that the second stock solution comprises HfX and HX, wherein X represents a common or closely related anionic species. Preferably, the hydrogen ion source is hydrochloric acid.

Hydrous hafnium oxide gels can be formed using the broth solutions disclosed herein. Although not wishing to be bound by any theory, it is believed the gelation process includes the steps of: complexation and decomplexation of hafnium with the complexing agent; hydrolysis of hafnium to a hydrous hafnium oxide; hydrogen ion sequestration by the organic base; and decomposition of the protonated organic base. For example, where hexamethylenetetramine (HMTA) is used as the organic base and urea as the complexing agent, the internal gelation process may proceed as shown in FIG. 1. First, a hafnium urea complex forms between hafnium and urea. As the temperature of the broth solution is increased, decomplexation of the hafnium with urea allows hydrolysis of the hafnium, concomitantly producing hydrogen ions. HMTA, a weak organic base, drives the hydrolysis reaction to completion by sequestering the hydrogen ions. Once most of the HMTA molecules are protonated, they decompose into ammonia molecules, making the system even more basic in pH, thereby allowing sequestration of even more hydrogen ions. In some instances, typically at higher temperatures, urea may catalyze decomposition of protonated HMTA molecules.

The broth solutions can be used to form spherules of hydrous hafnium oxide. Constituent concentrations, reaction temperature, and reaction time can be adjusted accordingly to obtain spherules of desired physical characteristics, as discussed further below.

Broth solutions used to form hydrous hafnium oxide spherules preferably have HMTA/$Hf^{4+}$ mole ratios of $\geq 1.2$, more preferably $\geq 1.5$, and most preferably $\geq 1.8$. In general, broth solutions that provide hydrous hafnium oxide gels with gelation times of 10 seconds or less have HMTA/$Hf^{4+}$ mole ratios of $\geq 1.8$, and thus are most preferred. Tables 1 and 2 show broth solutions having HMTA/$Hf^{4+}$ mole ratios ranging from about 1.2 to about 3.0, and about 1.5 to about 3.0, respectively. However, broth solutions with higher and lower HMTA/$Hf^{4+}$ mole ratios can be used.

FIG. 2 illustrates broth solution gelation time as a function of HMTA/HCl mole ratio for broth solutions heated at 90° Celsius where the concentration of HCl varies from 0.38 to 0.68 M. The HMTA/$Hf^{4+}$ mole ratio is given at each data point. Broth solutions that result in gelation times of 10 seconds or less are indicated below the dashed line. For example, a hydrous hafnium oxide gel may be formed with a gelation time of approximately 8 seconds at 90° Celsius where the HMTA/$Hf^{4+}$ mole ratio of the broth solution is 2.03. In some instances, broth solutions with lower HMTA/$Hf^{4+}$ mole ratios may be desirable where longer gelation times are acceptable or preferred. For example, a hydrous hafnium oxide gel may be formed with a gelation time of approximately 25 seconds at 90° Celsius where the HMTA/$Hf^{4+}$ mole ratio of the broth solution is 1.24.

Broth solutions preferably have HMTA/$H^+$ mole ratios of $\geq 1.0$, more preferably $\geq 1.2$, and most preferably $\geq 1.5$. In general, broth solutions that provide hydrous hafnium oxide gels with gelation times of 10 seconds or less have HMTA/$H^+$ mole ratios of $\geq 1.5$, and thus are most preferred. Tables 1 and 2 show broth solutions having HMTA/HCl mole ratios ranging from about 1.0 to about 5.0, and about 1.2 to about 3.9, respectively. However, broth solutions with higher and lower HMTA/$H^+$ mole ratios can be used.

TABLE 2

| HMTA/ H+ (mole ratio) | HMTA/ $Hf^{4+}$ (mole ratio) | HMTA[1] (M) | $Hf^{4+}$ (M) | $H^+$ (M) | G.T.[2] (s) | Rigidity | pH of Aged gel |
|---|---|---|---|---|---|---|---|
| 1.25 | 1.55 | 1.02 | 0.66 | 0.81 | 10 | 9 | |
| 1.50 | 1.85 | 1.11 | 0.55 | 0.68 | 10 | 4 | 4.0 |
| 1.50 | 1.84 | 1.14 | 0.62 | 0.76 | 9 | 7 | 3.5 |
| 1.58 | 1.98 | 1.18 | 0.61 | 0.75 | 10 | | |
| 1.75 | 2.16 | 1.19 | 0.55 | 0.68 | 8 | 4 | 4.2 |
| 1.75 | 2.17 | 1.26 | 0.58 | 0.72 | 7 | 3 | 4.5 |
| 2.00 | 2.47 | 1.36 | 0.55 | 0.68 | 6 | 2 | 5.2 |
| 2.00 | 1.98 | 1.20 | 0.60 | 0.59 | 10 | 8 | 5.1 |
| 2.07 | 2.07 | 1.23 | 0.60 | 0.60 | 9 | 8 | 5.2 |
| 2.50 | 1.85 | 1.12 | 0.61 | 0.45 | 10-11 | 8 | |
| 2.50 | 2.47 | 1.48 | 0.60 | 0.59 | 6 | 8 | |
| 2.75 | 2.03 | 1.24 | 0.61 | 0.45 | 8 | 8 | 4.2 |
| 2.75 | 2.74 | 1.37 | 0.50 | 0.50 | 7 | 4 | |
| 2.23 | 2.23 | 1.12 | 0.50 | 0.50 | 10 | 7 | 3.1 |
| 2.25 | 2.23 | 1.27 | 0.57 | 0.57 | 8 | 8 | |
| 2.50 | 2.49 | 1.24 | 0.50 | 0.50 | 8 | 6 | |
| 2.50 | 2.45 | 1.35 | 0.55 | 0.54 | 7 | 5 | 3.6 |
| 2.47 | 2.47 | 1.22 | 0.50 | 0.50 | 8 | 6 | 4.0 |
| 2.72 | 2.72 | 1.36 | 0.50 | 0.50 | 6 | 3 | 4.8 |
| 2.75 | 2.74 | 1.37 | 0.50 | 0.50 | 6 | 3 | |
| 2.75 | 2.75 | 1.43 | 0.52 | 0.50 | 5 | 3 | |
| 2.96 | 2.96 | 1.48 | 0.50 | 0.50 | 5 | 3 | 5.1 |
| 2.92 | 2.10 | 1.30 | 0.62 | 0.45 | 10 | | |
| 3.02 | 2.23 | 1.36 | 0.61 | 0.45 | 7 | 8 | |
| 3.21 | 2.30 | 1.37 | 0.60 | 0.43 | 10-11 | 8 | |
| 3.46 | 2.58 | 1.43 | 0.55 | 0.41 | 9 | | |
| 3.63 | 2.74 | 1.45 | 0.53 | 0.40 | 10 | | |
| 3.83 | 2.86 | 1.51 | 0.53 | 0.40 | 9 | | |

[1]Urea concentration is the same as the HMTA concentration.
[2]G.T. = Gelation Time (time needed for gelation to begin).

Referring again to FIG. 2, a hydrous hafnium oxide gel may be formed, for example, with a gelation time of approximately 8 seconds at 90° Celsius where the HMTA/HCl mole ratio of the broth solution is 2.8. However, in some instances, broth solutions with lower HMTA/HCl mole ratios can be used, particularly where longer gelation times are acceptable or preferred. For example, a hydrous hafnium oxide gel may be formed with a gelation time of approximately 25 seconds at 90° Celsius where the HMTA/HCl mole ratio of the broth solution is 1.0.

The concentration of hafnium in broth solutions preferably is in the range of about 0.40 M to about 0.80 M, more preferably about 0.50 M to about 0.70 M. However, broth solutions may be prepared having higher or lower hafnium concentrations, with the upper limit defined by the ability to prepare stable broth solutions, and the lower limit defined by the ability to prepare broth solutions that will gel in a gel-forming operation. The concentration of HMTA in broth solutions preferably is in the range of about 0.6 M to about 1.6 M. The concentration of $H^+$ in broth solutions preferably is in the range of about 0.2 M to about 0.8 M, and more preferably about 0.3 M to about 0.7 M.

Broth solutions preferably have HMTA/urea mole ratios of about 1.0. While this HMTA/urea mole ratio is preferred in order to ensure the proper mole ratios as against the amount of hafnium, the concentrations of the HMTA and urea do not have to approximate each other. In general, the concentration of urea in the broth solutions ranges from about 0.60 M to about 1.60 M. The optimum concentrations of HMTA and urea can vary depending on the temperature at which the gel is formed, the desired gelation time, and the desired characteristics of the gels. For example, higher temperatures permit the use of lower amounts of organic base and complexing agent, and lower temperatures permit the use of higher amounts of organic base and complexing agent.

Gel spherules prepared in accordance with the present disclosure are typically formed at temperatures greater than 60° Celsius, and preferably from about 70° Celsius to about 90° Celsius. However, lower or higher temperatures may be used where the concentrations of the constituents permit, meaning that the broth solution can be adapted to a gel-forming operation at the selected operating temperature. For example, a high concentration of particular broth constituents may allow the gelation reaction to be performed at lower temperatures and/or shorter gelation time, with the upper limit on concentration defined by the ability to form stable broth solutions. Conversely, a low concentration of particular broth constituents may allow the gelation reaction to be performed at higher temperatures and/or longer gelation times, with the lower limit on concentration defined by the ability to form gels from the broth.

Preferably, hydrous hafnium oxide spherules are formed by a gelation process wherein gelation occurs in about 10 seconds or less. Where gelation times begin to exceed about 10 seconds, microdroplets of broth solution can coalesce and form larger droplets prior to gelation. In some instances, spherules resulting from coalesced droplets may cause problems in the gel-forming operation. In addition, such spherules may not provide hydrous hafnium oxide spherules of the desired specifications. Preferably, spherules produced are structurally strong spherules.

Figure 3:
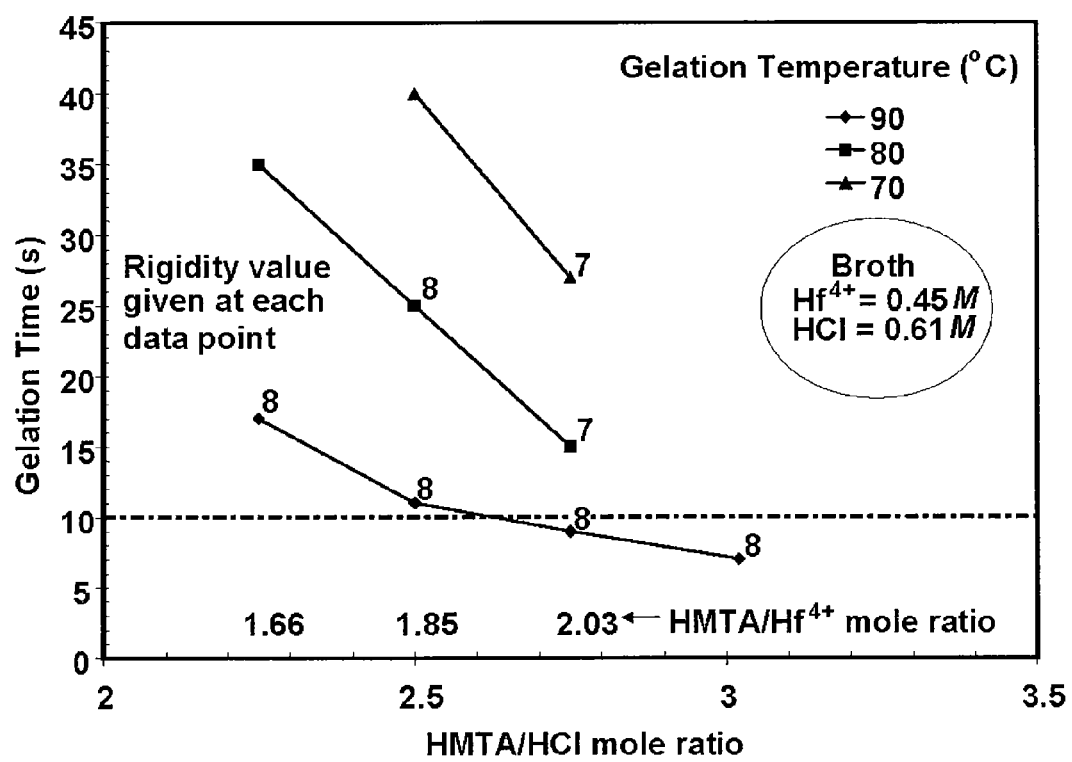
FIG. 3 illustrates gelation time as a function of HMTA/HCl mole ratio.
Figure 4:
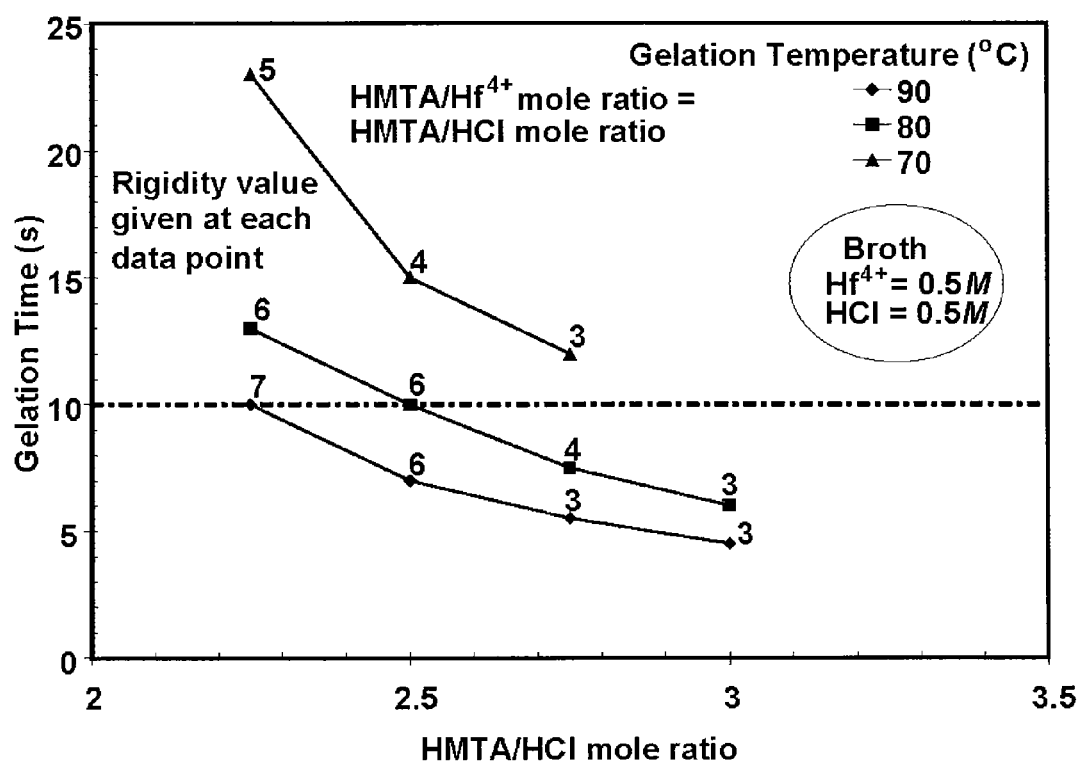
FIG. 4 illustrates gelation time as a function of HMTA/HCl mole ratio.

FIG. 3 illustrates gelation time as a function of HMTA/HCl mole ratio for broths heated at 70, 80, and 90° Celsius. The concentrations of $He^+$ and HCl in the broth are 0.45 and 0.61 M, respectively, and the concentration of HMTA is varied. At a gel-forming temperature of 90° Celsius, a HMTA/HCl mole ratio of $\geq 2.6$ is preferable to have a gelation time $\leq 10$ seconds. To have gelation times of $\leq 10$ seconds at 70 and 80° Celsius, the preferred HMTA/HCl mole ratios are predicted to be about 3.0 and 3.2, respectively, for broths of the given hafnium and HCl concentrations. FIG. 4 illustrates gelation time as a function of HMTA/HCl mole ratio for broths heated at 70, 80 and 90° Celsius with $Hf^{4+}$ and HCl concentrations of 0.5 M. At 90° Celsius, a HMTA/HCl mole ratio of $\geq 2.25$ is preferable to have gelation in $\leq 10$ seconds. At 80° Celsius, a HMTA/HCl mole ratio of $\geq 2.50$ is preferable to have gelation in $\leq 10$ seconds. To have gelation times of $\leq 10$ seconds at 70° Celsius, the preferred HMTA/HCl mole ratio is predicted to be about 3.0 for broths of the given hafnium and HCl concentrations.

Figure 5:
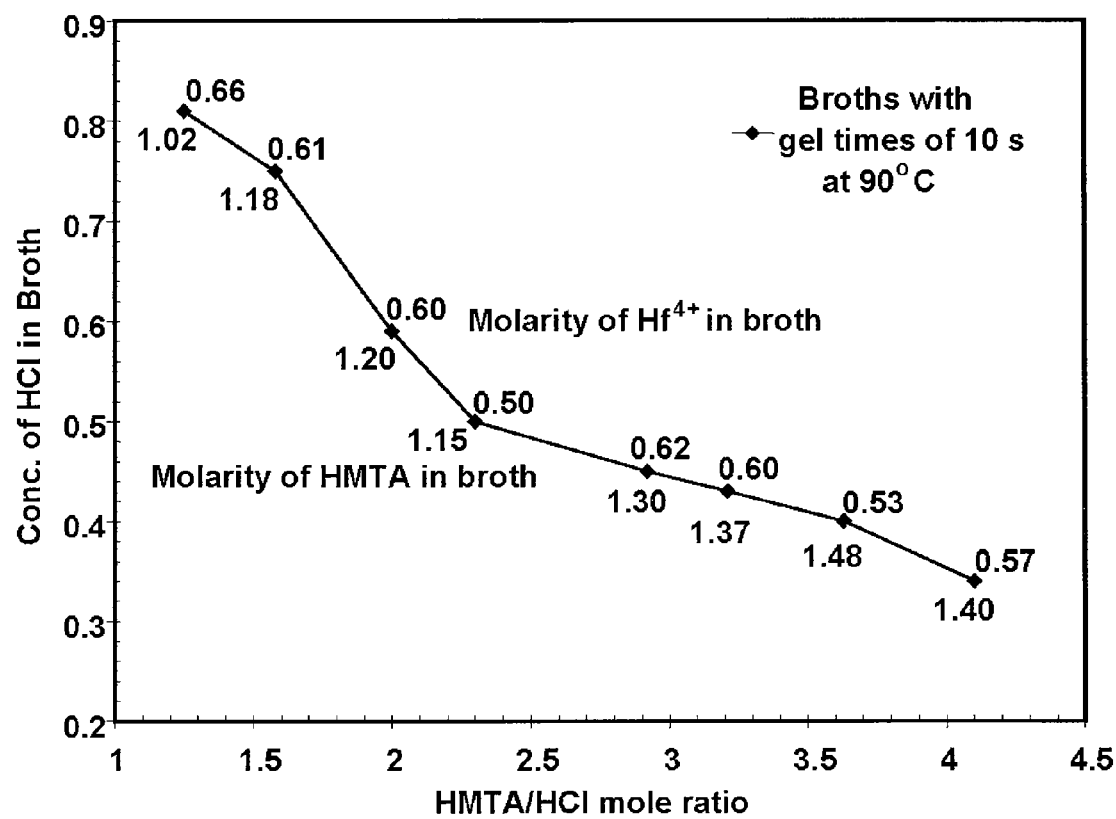
FIG. 5 illustrates concentration of HCl as a function of HMTA/HCl mole ratio.

Exemplary broth solutions for forming hydrous hafnium oxide spherules are illustrated in Table 2. The broths illustrated in Table 2 can be used to form hydrous hafnium oxide gels in $\leq 10$ seconds when heated to about 90° Celsius in a gel-forming operation. The broths illustrated in Table 2 can be used to form hafnium oxide gels ranging from soft to very hard in rigidity. For reasons of economics, preferred broths may be those in which the HCl and HMTA concentrations are minimized. For example, a broth having HCl, HMTA, urea, and hafnium concentrations of 0.45 M, 1.24 M, 1.24 M, and 0.61 M, respectively, may be preferable. FIG. 5 demonstrates the concentration of HCl in the broth as a function of HMTA/HCl mole ratio for broth formulations which gel in about 10 seconds at 90° Celsius. The concentrations of hafnium and HMTA are given at each data point. This data in conjunction with the data in FIGS. 2-4 and Tables 1 and 2, make it possible to choose a broth formulation appropriate for the desired quality of hydrous hafnium oxide gel. In particular, this data provides preferred broth formulations for making hydrous hafnium oxide spherules with gelation times of $\leq 10$ seconds and with a range of rigidities.

Figure 6:
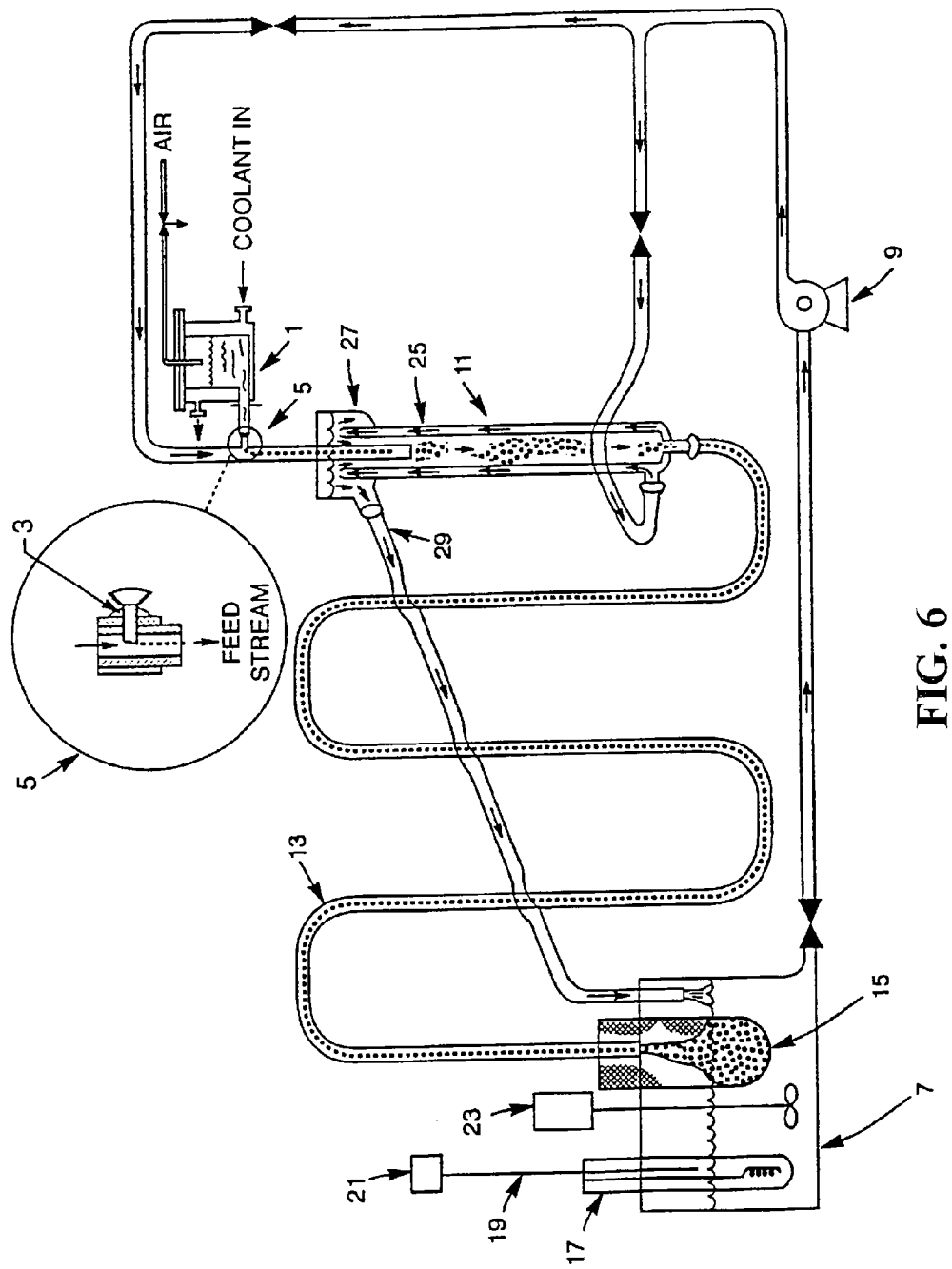
FIG. 6 illustrates an apparatus useful for preparing hydrous hafnium oxide gel spherules.

In one embodiment, the hydrous hafnium oxide spherules are produced by a gel-forming operation as demonstrated in FIG. 6. A chilled broth is first prepared and then added to the chilled apparatus broth pot 1 and processed through the gel-forming or spherule forming apparatus. The system also includes a needle 3 which is used in a two-fluid nozzle 5 for placing broth droplets in a hot organic medium where gelation occurs.

The organic medium is preferably water-immiscible with a density slightly higher than that of the aqueous broth solution. Large droplets are best formed if there is a density difference between the organic medium and broth of about 0.05 to 0.10 g/cm³. The density difference can be different for small droplets. The organic medium may be a one-component solvent or a binary mixture. For example, silicone oils, such as Silicon Fluid 200 (Dow Corning, Midland, Mich.), work well for the temperature range from ambient temperatures to 100° Celsius. A mixture of approximately 75% perchloroethylene (PERC) and 25% isoamyl alcohol (IAA) can be used at temperatures up to about 90° Celsius. Trichloroethylene (TCE) can be used at temperatures of $\leq 65°$ Celsius. Kerosene type hydrocarbons and 2-ethyl-1-hexanol may also be used as gel forming media.

If the gel-forming medium has a high viscosity or boiling point (e.g., PERC, 2-ethyl-1-hexanol or silicone oil), the residual medium on the gelled spherules often is removed by washing with a more volatile organic medium. TCE, carbon tetrachloride or hexane can be used for silicone oil; isopropyl alcohol for PERC; and carbon tetrachloride for 2-ethyl-1-hexanol. Neither TCE nor the 75% PERC, 25% isoamyl alcohol mixture require an organic wash after aging of the gel.

Introduction of the aqueous broth droplets into a flowing stream of hot, water-immiscible, organic medium causes decomplexation of the hafnium complexed with the complexing agent, allowing hydrolysis and gelation of hafnium to occur. The hydrolysis reaction is driven by protonation of the organic base molecules, which effectively removes $H^+$ from the broth. The hydrolysis reaction is also driven, in some cases, by the decomposition of the protonated organic base molecules to form ammonia molecules. The rate at which these reactions take place depends on both temperature and the concentration of the broth constituents. Generally, when gelation occurs, the pH value of the broth droplets will be at, or above, the pH value of precipitation. Precipitation begins at approximately pH 2 for hafnium salts in a chloride solution.

In the gel-forming process, the organic medium is heated at a temperature in the range of 45° Celsius to 100° Celsius, preferably in the range of 70° Celsius to 90° Celsius. Preferably, gelation time is $\leq 60$ seconds. More preferably, gelation time is <30 seconds. Most preferably, gelation time is $\leq 10$ seconds. As the microdroplets of the broth remain ungelled in the organic medium, they may coalesce and form larger droplets, which in some cases is less preferred.

The system of FIG. 6 includes a reservoir 7 for heating the organic medium, a pump 9 for circulating the organic medium, a chilled broth pot 1, a two-fluid nozzle system 5 for controlling the size of the broth droplets, a glass gelation column (forming column) 11, a downstream transport line 13 to provide a residence time for the gel spherules to hydrolyze and solidify, and a product collector 15 for collecting and aging the gelled spherules and also for separating the organic medium from the gelled spherules.

The organic medium reservoir 7 may comprise a stainless steel open-top rectangular container. One or more heating blades 17 may be positioned at the rear of the reservoir to heat the organic medium. A thermocouple 19 may be positioned in the basket at the bottom and near the front of the reservoir and connected to a temperature controller 21 used to control the organic medium temperature. A stirrer 23 with its shaft positioned away from the heating blade or blades 17 (other blades not shown) and its impeller located near the bottom of the reservoir is used to mix and maintain the organic medium at a desired temperature. Occupying most of the front space in the reservoir 7 is a large removable basket 15 which serves as a backup to prevent any spilled gelled spherules from being pumped out of the reservoir circulating pump.

The pump 9 is used to pump the hot organic medium from the reservoir 7 through a line to the vertically positioned glass gelation column 11. The flow from the pump 9 is divided into two streams which are controlled by manual valves. The flow of one of the streams may be routed to a position above the center of the top of the gelation column 11. Vertically attached to this line may be a tube whose outlet end is inserted into the entrance of the gelation column. The tube is part of the two-fluid nozzle 5 system that is used to control the size of the droplets. The other hot organic medium stream from the pump 9 is routed to a fitting at the bottom of the gelation column 11 and flows up through a shell 25 that surrounds the gelation column 11. The hot organic medium over-flows at the top of the column, first into the gelation column 11, and then into an overflow cup 27. A large tube 29 is connected to a fitting from the overflow cup 27 to route any overflow back to the hot organic medium reservoir 7. During operation, the flow of organic medium from the heating shell 25 is normally adjusted to provide only a slight overflow.

As shown in FIG. 6, the two-fluid nozzle system 5 comprises a needle 3 which is perpendicularly inserted through the wall of the tube to the midpoint of the hot organic medium carrier stream and is positioned approximately 5 inches above the entrance to the gelation column 11. The chilled broth is jetted into the laminar flowing oil by air pressurizing the broth pot 1, forcing the broth out a tube at the bottom of the broth pot through a short plastic line that is connected to the needle 3. The size of the droplets formed is dependent on the gauge of the needle and the flow rates of the hot organic medium and of the broth.

The hot organic medium carrying the droplets from the two-fluid nozzle tube 5 flows directly into the central concurrent flow tube of the jacketed gelation column 11 where it is desirable for the droplets to begin to gel. On exiting the gelation column 11, the gelling spheres flow into a serpentine transport line 13. This line is long enough (about 8 feet) to allow the gelling spheres to have a total residence time of 25 to 35 seconds to the collection basket 15. The transport time also includes the time the spherules are passing through the gelation column. The gelation column and serpentine transport system are designed to be a siphoning system with a gravity head of about 60 cm for oil temperatures in the range of about 55° Celsius to 100° Celsius.

The collection basket 15 is positioned above the hot organic medium reservoir 7, and is used to collect and separate the gel spherules from the hot organic medium as they exit the serpentine transport line 13. Preferably, the collected gel spherules are aged by lowering the collection basket 15 into the reservoir 7. Aging the gel spherules assures completion of hafnium hydrolysis and reproducibility of the gelation process. The degree of aging can influence the type of gel structure obtained. After being held in the heated organic medium for a period of $\leq 60$ minutes, preferably between 10 and 30 minutes, to allow for completeness of gelation and for aging, the spherules are removed from the organic medium. After aging, the bulk of the organic medium is drained from the gel spherules and the residual organic medium is removed by a series of washing steps to remove reaction impurities. If silicone oil, 2-ethyl-1-hexanol, or PERC is used as the organic medium, the residual medium is removed with an organic solvent, such as for example trichloroethylene, before basic washing with an aqueous medium. The soluble reactants and reaction products, organic base, complexing agent, and ammonium salts, such as ammonium chloride, can be removed from the gelled spherules by washing with 0.1 M to 5 M ammonium hydroxide and then with deionized water.

Another basket of similar design may also be positioned above the hot oil reservoir to filter the return organic medium from a tube which is connected to the overflow drain line at the top of the gelation column.

Hydrous hafnium oxide gels prepared in accordance with the present disclosure can provide gels in a range of rigidities from soft to very hard as selected by adjustment of the above gelation parameters. Initially, a nominal scale of 1 to 10 collins units of rigidity was used to define the rigidity of the gel. A unit of 1 collins represents gels with the approximate consistency of water and 10 collins represents gels that are almost too hard to penetrate with a spatula. Most of the gels formed using broth parameters of the present disclosure had rigidities between 3 collins and 9 collins.

In one embodiment, hafnium oxide spherules with high crush strength may be prepared in accordance with the present disclosure. Broth solutions comprising a hafnium metal salt, a yttrium metal salt, an acid, a complexing agent, and an organic base can be used to form gel spherules of high crush strength. Preferably, the yttrium metal salt is $Y_2O_3$. Cerium, preferably in the form of $Ce_2O_3$, can also be a constituent in broth solutions used to produce spherules with high crush strength. Once the spherules are formed and retrieved from a gel-forming operation, they can be washed and sintered to provide hafnium oxide spherules with high crush strength. These structurally strong spheres can be used in a variety of applications, such as for example, in grinding operations in which the spherules serve as abrasion resistant microspheres.

In one embodiment, hydrous hafnium oxide spherules may be converted to spherules of hafnium monohydrogen phosphate. After the hydrous hafnium oxide gel spherules are formed and retrieved from a gel-forming operation, they can be rinsed with an amount of phosphoric acid having a concentration $\leq 0.5$ M, rinsing for a period of time sufficient to allow the spherules to be converted to acid insoluble hafnium monohydrogen phosphate. Next, the spherules can be mixed with concentrations of phosphoric acid $\geq 0.5$ M. The spherules can be covered with an amount of phosphoric acid sufficient to complete the conversion of the spherules to acid insoluble hafnium monohydrogen phosphate and to prevent the hydrous hafnium oxide from dissolving before the conversion. Finally, the spherules can be placed in a sealed pressure vessel and heated in the presence of phosphoric acid to a predetermined temperature. The temperature may be ramped up over time to produce the desired crystallinity. After the desired crystallinity has been achieved, the spherules may be cooled and rinsed to remove unreacted phosphoric acid, and then dried.

Applications

Hydrous hafnium oxide gels of desirable shape, size, rigidity, and composition can be prepared using the optimum parameters and broth solutions as described. For example, spherules of pure hydrous hafnium oxide may be prepared using the broth solutions and methods presently disclosed. The spherules may be of specific size, such as for example, from 0.1 mm to 2 mm in diameter. Spherules may also be produced wherein hydrous hafnium oxide spherules contain particles of other chemicals, metals, and biochemicals homogeneously dispersed throughout the matrix of the gel. These materials may be embedded homogenously throughout the gel matrix to produce dual-purpose ion exchangers capable of removing several different contaminants from a waste stream. In some cases, gelantinous spherules of hydrous hafnium oxide can be converted by chemical reactions to other ion exchanger spherules such as hafnium monohydrogen phosphate. The hydrous hafnium oxide spherules can also be converted to other chemical forms, including, but not limited to, tungstate, molybdate, vanadate, and selenate. Furthermore, to create more surface area, spherules can be prepared containing embedded particles of material that can subsequently be dissolved and removed to create larger, interconnecting pores within the spherules.

In one embodiment, the hydrous hafnium oxide gels may be formed into spherules for use in ion exchange applications. The hydrous hafnium oxide spherules can be reproducibly made on a small or large scale. Preparation of inorganic ion exchangers as spherules improves the flow dynamics for column operations and expands their practical applications. For example, one advantage is that the densities and/or porosities of the spherules can be tailored by varying process parameters to produce a finished spherule that is optimally designed for a specific sorption process. In addition, the inorganic exchanger spherules have sorption characteristics that are equal to or better than those obtained for most commercial powders tested.

Some ion exchange applications of the spherules include removing certain fission products and actinides from slightly acidic solutions, as well as removing certain fission products and actinides from alkaline tank supernatants. The spherules can also be used for treating contaminated wastewater to remove undesirable elements such as lead and mercury. Other applications include removing radioisotopes from groundwater and removing actinides and fission products from sludge leachates. In addition, other applications include removal of heavy metals from slightly acidic mine drainage; removal of radionuclides from organic streams; and cleanup and concentration of liquid wastes in radioactive cells.

Hydrous hafnium oxide gels can also be made or fabricated into, for example, films, slabs, or fibers. These gels may be used alone, or post-treated as set forth above, to be used as inorganic ion exchangers, catalysts, getters, dielectric materials, and ceramic materials in systems which may preclude the use of spherules.

The formulations and methods of the present disclosure can also be useful for the preparation of gels for potential use in capillary, film or slab gel electrophoresis. For example, the gel formulations may be vacuumed into capillary tubes that are then heated to cause formation of fibrous gels. The tubes or fibers may be either of hydrous hafnium oxide or hafnium oxide. Additionally, these tubes or fibers may include suspendable particles homogeneously embedded within the hydrous hafnium oxide or hafnium oxide tubes or fibers. These tubes and fibers are prepared by first forming the broth, either with or without additional particles therein. Then, the broth is formed into a gel, which is then formed into a fiber or a tube. This process may be performed using a number of different tube or fiber forming techniques. For example, the broth may be pulled through an electrophoresis capillary tube. Then, the tube may be heated to form the gel tube. Alternatively, the broth may be formed into gel spherules which are placed in an extruder and extruded into microfibers. The gels can be washed to remove reaction impurities. These tubes and fibers may also be heated to drive off water to form hafnium oxide fibers.

In a similar manner, other shapes of hydrous hafnium oxide may be formed, such as films or slabs. The gel formulations may be drawn into molding cavities and heated to form the gel film or slab. The surfaces of the molding cavities may be pretreated to facilitate removal of the gels. Once removed from the molds, the gels can be washed to remove reaction impurities. Alternatively, the broth may be formed into gel spherules which are placed in an extruder and extruded into thin films. The films or slabs may be heated to drive off water to form hafnium oxide films or slabs.

EXAMPLES

Example 1

Preparation of HMTA/Urea Stock Solutions

The solubility of HMTA in water at room temperature is about 3.7 M. The maximum solubility of HMTA in a solution containing 3.2 M urea is about 3.2 M. 3.2 M HMTA/3.2 M urea solutions can be used, which have a density of 1.14 g/mL. A good technical grade of crystalline HMTA is preferred for the internal gelation process of the present disclosure. In particular, additives used to make HMTA free flowing cause an undesirable reaction to occur between the HMTA and urea. This reaction can be detrimental to the internal gelation process, thereby making it less reproducible, especially for runs at higher temperatures (i.e., >80° Celsius). This behavior occurs when samples of about 3.2 M HMTA (free flowing type) and about 3.2 M urea are heated together at 95° Celsius for several minutes. The solution develops a pearl-essence that intensifies with time. While the crystalline form of HMTA is preferred, the free flowing form of HMTA can be used in some applications, especially at temperatures <80° Celsius and for some applications at temperatures >80° Celsius, depending upon which additives the manufacturer added to the HMTA to facilitate its free flowing properties.

A 2-L HMTA/urea stock solution can be prepared by adding 383.38 g urea ($NH_2CONH_2$) and 892.22 g HMTA ($C_6H_{12}N_4$) to a clean 3-L beaker and dissolving with chilled (5±5° Celsius) deionized water. The volume is brought up to about 2 L via slowly adding the deionized water and mixing. Once the solids are completely dissolved, the liquid is transferred to a 2-L volumetric flask and brought to volume. The solution is mixed well, and a sample can be taken for analysis to determine the exact concentrations of the HMTA and urea. In this example, the concentrations were 3.19 M HMTA and 3.19 M urea.

Example 2

Preparation of Hafnium Tetrachloride Stock Solutions

The following procedure can be used to prepare hafnium tetrachloride stock solutions. Hafnium tetrachloride and 5.626 M HCl can be used in preparing the stock solutions. Hafnium tetrachloride is a powder and its molecular weight is 320.3 g/mol. The amounts of hafnium tetrachloride and HCl needed are calculated for a particular stock preparation. HCl is transferred to a beaker and then placed in an ice bath on a stir plate with a large stir bar. Chilled deionized water is added to the HCl to achieve about three-fourths of total feed volume needed. Mixing these chemicals is exothermic. Lowering the temperature minimizes the amount of volatile HCl vapor released. Hafnium tetrachloride is carefully weighed out into a small beaker. The hafnium tetrachloride is added very slowly to the acid solution, stirred manually several times during addition of powder. The wall of the beaker containing the feed is rinsed with the solution using a small pipette. The same pipette is used to rinse out the hafnium beaker with water into the feed. The volume of the mixture is then brought up to a predetermined mark on the beaker. A stir bar is added, and the solution is stirred for approximately twelve hours. If the volume drops much below the mark, deionized water is added to bring the volume back up to the mark. At the mark, the hafnium concentration is near the predetermined molarity. When the hafnium tetrachloride is totally into solution, the solution is carefully transferred into a tared volumetric flask with a funnel, being careful not to splash the sides of the funnel. Rinses from the funnel and beaker are added to the flask, and the volume brought up to the meniscus. The flask is then weighed to determine the density of the solution. By way of example, three stock solutions were prepared with the following concentrations: 0.977 M HfCl$_4$, 1.206 M HCl; 0.969 M HfCl$_4$, 0.958 M HCl; 1.010 M HfCl$_4$, 0.745 M HCl.

Example 3

Broth Stability Tests

A stable broth is one that remains clear and does not gel or precipitate for reasonable periods of time (usually about 1 hour) at 10° Celsius or less. Broths can be prepared using hafnium stock solutions and HMTA/urea stock solutions, and each can be tested for broth stability. Calculated amounts of chilled HMTA/urea stock solution, hafnium stock solution, and water can be mixed together according to the following procedure.

A rack for holding thin-walled glass centrifuge tubes is placed in an ice bath. Predetermined volumes of 3.19 M HMTA/3.19 M urea stock solution, for example, and acidified stock solution of hafnium tetrachloride are separately and carefully pipetted to these tubes with calibrated electronic pipettes, and the tubes are subsequently chilled for approximately 20 minutes. The centrifuge tubes containing the acidified hafnium stock solutions also serve as the broth tubes and are labeled accordingly as to stock solution and the HMTA/H$^+$ mole ratio.

When needed, calculated amounts of deionized water are added with a calibrated electronic pipette to the centrifuge tubes containing the acidified hafnium stock solutions to obtain the targeted concentrations for the broth.

To prepare a broth, a volume of chilled HMTA/urea stock solution is carefully removed with a pipette and transferred to a centrifuge tube containing the acidified hafnium stock solution. The broth is mixed with a Teflon stirring rod and observed until there is the first visual sign of gelation or a period of 1 hour passes. The time of gelation is recorded. Tests are done in duplicate. About 5 minutes after mixing, if gelation has not occurred, the pH of the broth for one of the samples is measured with a calibrated temperature compensated Ross electrode.

Example 4

Gelation Tests

Gelation tests can be performed according to the following procedure. A portion of the hafnium stock solution (at room temperature) and deionized water are carefully pipetted into the bottom of a glass centrifuge tube in an ice bath. The required volume of HMTA/urea stock solution is pipetted into the bottom of a separate plastic centrifuge tube and placed in an ice bath. Both are chilled for 10 minutes to attain ice bath temperature. The chilled HMTA/urea stock solution is quantitatively pipetted into the chilled hafnium stock solution and mixed well. Care is taken not to splash the broth onto the test tube walls. The broth is maintained in the ice bath for an additional 5 minutes.

The broth tube is then placed in a hot water bath at the desired temperature. The test tube is gently swirled to observe when the gel sets. A stopwatch is used to measure the time needed for gelation to occur. When gelation begins, the clear broth becomes viscous and motionless. The gel is then allowed to age for 10 minutes in the hot bath at the same temperature.

The test tube is then removed from the hot bath, and the gel is allowed to cool to room temperature. The transparency of the gel [on a scale of 1 (transparent) to 10 (opaque)] is subjectively determined and recorded. The rigidity of the gel is determined by inserting a spatula into the center of the gel and is quantified on a subjective scale of 1 (no resistance, almost like water) to 10 (high resistance, difficult to penetrate).

The gel is then broken up by stirring with the spatula. Afterward, the test tube is centrifuged to remove pockets of air and to compact the gel into the bottom of the tube. A calibrated pH probe is inserted into the gel to measure the pH. It can take up to 30 seconds for the pH reading to stabilize.

As a minimum, duplicates of each broth are tested to ensure accuracy. If the gel times and properties match, the test results are assumed to be acceptable. If the gel times do not match, additional tests are conducted to resolve the problem and obtain consistent values.

Example 5

Determination of Optimum Broth Formulations

Optimum broth constituent concentrations, as well as gelation reaction time and temperature are set forth below in the text and the referenced figures.

FIG. 2 illustrates broth solution gelation time as a function of HMTA/HCl mole ratio for broth solutions heated at 90° Celsius where the concentration of HCl varies from 0.38 to 0.68 M. The HMTA/Hf$^{4+}$ mole ratio is given at each data point. Broth solutions that result in gelation times of ≦10 seconds are indicated below the dashed line. Broth solutions resulting in gelation times of ≦10 seconds have HMTA/Hf$^{4+}$ mole ratios of ≧1.85. Table 2 shows additional examples of broth solutions that result in gelation times of ≦10 seconds at a gel-forming operation temperature of 90° Celsius. The range of concentration in the broth varies from 0.50 to 0.66 M for Hf$^{4+}$ and 0.40 to 0.81 M for HCl. The pH of the aged gels formed from these broths ranges from 3.1 to 5.2. The consistency of the aged gels (rigidity) ranges from soft to very hard.

FIG. 3 demonstrates gelation time as a function of HMTA/HCl mole ratio for broths heated at 70, 80, and 90° Celsius. The concentrations of Hf$^{4+}$ and HCl in the broth are 0.45 and 0.61 M, respectively. The concentration of HMTA is varied. For the given broth solutions, at a gel-forming temperature of 90° Celsius, a HMTA/HCl mole ratio of ≧2.6 is preferable to have a gelation time ≦10 seconds. At 80° Celsius, an estimated HMTA/HCl mole ratio of about 3.0 will provide gelation in ≦10 seconds. At 70° Celsius, an estimated HMTA/HCl mole ratio of about 3.2 will provide gelation in ≦10 seconds.

FIG. 4 demonstrates gelation time as a function of HMTA/HCl mole ratio for broths heated at 70, 80 and 90° Celsius with Hf$^{4+}$ and HCl concentrations of 0.5 M. For the given broth solutions, at 90° Celsius, an approximate HMTA/HCl mole ratio of ≧2.25 will provide gelation in ≦10 seconds. At 80° Celsius, an approximate HMTA/HCl mole ratio of ≧2.50 will provide gelation in ≦10 seconds.

As the HMTA/HCl mole ratios increase the rigidities decrease. At a HMTA/HCl mole ratio of 3, the resulting gels are fairly soft. By extrapolation of the plot for the 70° Celsius data in FIG. 4, an approximate HMTA/HCl mole ratio of 3.0 can provide gelation in ≦10 seconds. The resulting gel can be expected to be very soft.

FIG. 5 demonstrates the concentration of HCl in the broth as a function of HMTA/HCl mole ratio for broth formulations which gel in about 10 seconds at 90° Celsius. This data in conjunction with the data in FIGS. 2-4 and Tables 1 and 2, make it possible to choose a broth formulation appropriate for the desired quality of hydrous hafnium oxide gel for which the gel will be used.

Example 6

Hydrous Hafnium Oxide Microsphere Preparation

Hydrous hafnium oxide microspheres can be prepared according to the following procedure. In this preparation, 129.0 mL of broth is prepared by slowly mixing 49.0 mL of chilled 3.11 M HMTA+3.11 M urea solution (0 to 5° Celsius) with 80.0 mL of chilled 0.98 M hafnium tetrachloride stock solution. The broth has HMTA/$Hf^{4+}$ and HMTA/HCl mole ratios of 1.95 and 1.58, respectively. The concentrations of $Hf^{4+}$, HCl, HMTA, and urea for the broth are 0.61, 0.75, 1.18, and 1.18 M, respectively. A two-fluid nozzle system with a 21 gauge flat-tipped needle is used to provide the broth droplets. The broth droplets are introduced from the tip of the needle into a flowing stream of heated immiscible organic medium (approximately 90° Celsius). Silicone oil (Dow Corning 200 silicone fluid) is used in this preparation. From there, the droplets are transported into the gel-forming apparatus. The droplet size is controlled by using a two-fluid nozzle concept and varying the gauge of the needle and the flow rates of the hot silicone oil and the chilled broth. The droplets begin to gel in 10 to 11 seconds and are subsequently collected in a stainless steel mesh basket downstream. It takes approximately 30 seconds for the gelled microspheres to reach the basket. Afterward, the microspheres are aged for 20 minutes in silicone oil at approximately 90° Celsius to complete the gelation process. The microspheres are washed four times with trichloroethylene to remove the silicone oil, and then washed six times with 0.5 M $NH_4OH$ to remove reaction impurities. The washed microspheres are then air-dried and weighed. Following this example, about 27.3 grams of air-dried microspheres are obtained which have a tap density of 1.6 g/mL.

Example 7

Hydrous Hafnium Oxide Microsphere Preparation

Hydrous hafnium oxide microspheres can be prepared according to the following procedure. In this preparation, a 364.7 mL broth is prepared by slowly mixing 179.03 g (156.49 mL) of chilled 3.2 M HMTA+3.2 M urea solution (0 to 5° Celsius) with 271.15 g (208.18 mL) of chilled 1.05 M hafnium tetrachloride stock solution. The broth solution has HMTA/$Hf^{4+}$ and HMTA/HCl mole ratios of 2.30 and 3.21, respectively. The concentrations of $Hf^+$, HCl, HMTA, and urea for the broth are 0.60, 0.43, 1.37, and 1.37 M, respectively. A two-fluid nozzle system with an 18 gauge flat-tipped needle is used to provide the broth droplets. The droplets begin to gel in 10 to 11 seconds in the forming column in silicone oil at 90° Celsius and are subsequently collected downstream in a stainless steel mesh basket. The run lasts about 54 minutes. Afterward, the microspheres are aged for 20 minutes in silicone oil at approximately 90° Celsius to complete the gelation process. The microspheres are washed four times with TCE to remove the silicone oil, and subsequently washed six more times with 0.5 M $NH_4OH$ to remove reaction impurities. The estimated gel-sphere volume is about 300 mL. Afterward, the gel spheres are air dried and weighed. Following this example, about 63.86 grams of air-dried microspheres are obtained which have a tap density of 1.65 g/mL.

Example 8

Schedule to Heat, Calcine, and Sinter Hydrous Hafnium Oxide Gel Spheres

Hydrous hafnium oxide gel spheres can be heated, calcined, and sintered according to the following procedure. Hydrous hafnium oxide gel spheres are air dried for 48 hours in stainless steel pans at ambient temperature. The maximum number of layers of gel spheres is three. The air-dried microspheres are then sieved using an 8 inch diameter stainless steel sieve. A desired amount of microspheres are placed in an alumina or platinum boat and heated at 80° Celsius in a flowing stream of oxygen (30 cc/min) atmosphere for 2 hours. The heat-up ramp is 60° Celsius/hour. The microspheres are then heated at 190° Celsius in a flowing stream of oxygen atmosphere for 3 hours. The heat-up ramp is 60° Celsius/hour. The microspheres are then heated at 400° Celsius in a flowing stream of oxygen atmosphere for 2 hours. The heat-up ramp is 60° Celsius/hour. The microspheres are then heated at 1046° Celsius in a flowing stream of oxygen atmosphere for 4 hours. The heat-up ramp is 180° Celsius/hour. Next, the furnace is turned off and the microspheres are allowed to cool to ambient temperature. The microspheres are removed from the furnace, weighed, and sieved to determine the size range. The slow-pour density and crush strength are measured.

Example 9

Hafnium Oxide Microspheres with High Crush Strength

Hafnium oxide microspheres with high crush strength can be prepared according to the following procedure. A broth can be prepared that is designed to yield sintered $HfO_2$ microspheres with 8 mole % yttrium or 4.4 weight % in $Y_2O_3$. To prepare the 445.16 mL broth, 222.7 g (194.7 mL) of chilled 3.2 M HMTA+3.2 M urea solution is slowly added with mixing to 250.46 mL of a hafnium plus yttrium chloride solution which is also chilled. The hafnium plus yttrium chloride solution is prepared by dissolving 2 g of fine Y metal powder in 324.27 g (248.96 mL) of 1.047 M $HfCl_4$ stock solution which is 0.75 M in HCl. The density of the hafnium chloride stock solution without Y is 1.302 g/mL. The HMTA/($Hf^{4+}+Y^{3+}$) and HMTA/HCl mole ratios of the broth are 2.20 and 3.34, respectively. The concentrations of $Hf^+$, $Y^{3+}$, HCl, HMTA, and urea for the broth are 0.586, 0.051, 0.42, 1.4, and 1.4 M respectively. A two-fluid nozzle system with an 18 gauge flat-tipped needle is used to provide the broth droplets. The droplets begin to gel in 10 to 11 seconds in the forming column in silicone oil at 91° Celsius and are subsequently collected downstream in a stainless steel mesh basket. The run lasts about 55 minutes. Afterward, the microspheres are aged for 20 minutes in silicone oil at approximately 90° Celsius to complete the gelation process, then washed four times with TCE, washed six more times with 0.5 M ammonium hydroxide, and then four more times with deionized water. The bead volume after the washing steps is about 330 mL.

Figure 7:
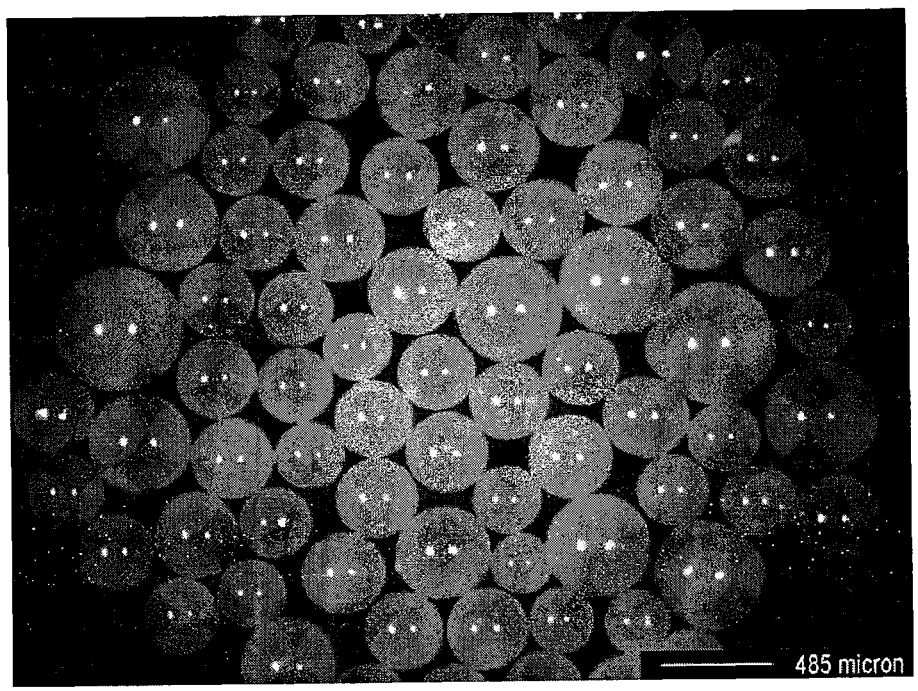
FIG. 7 shows a microscopic image of sintered $HfO_2$—$Y_2O_3$ microspheres.
Figure 8:
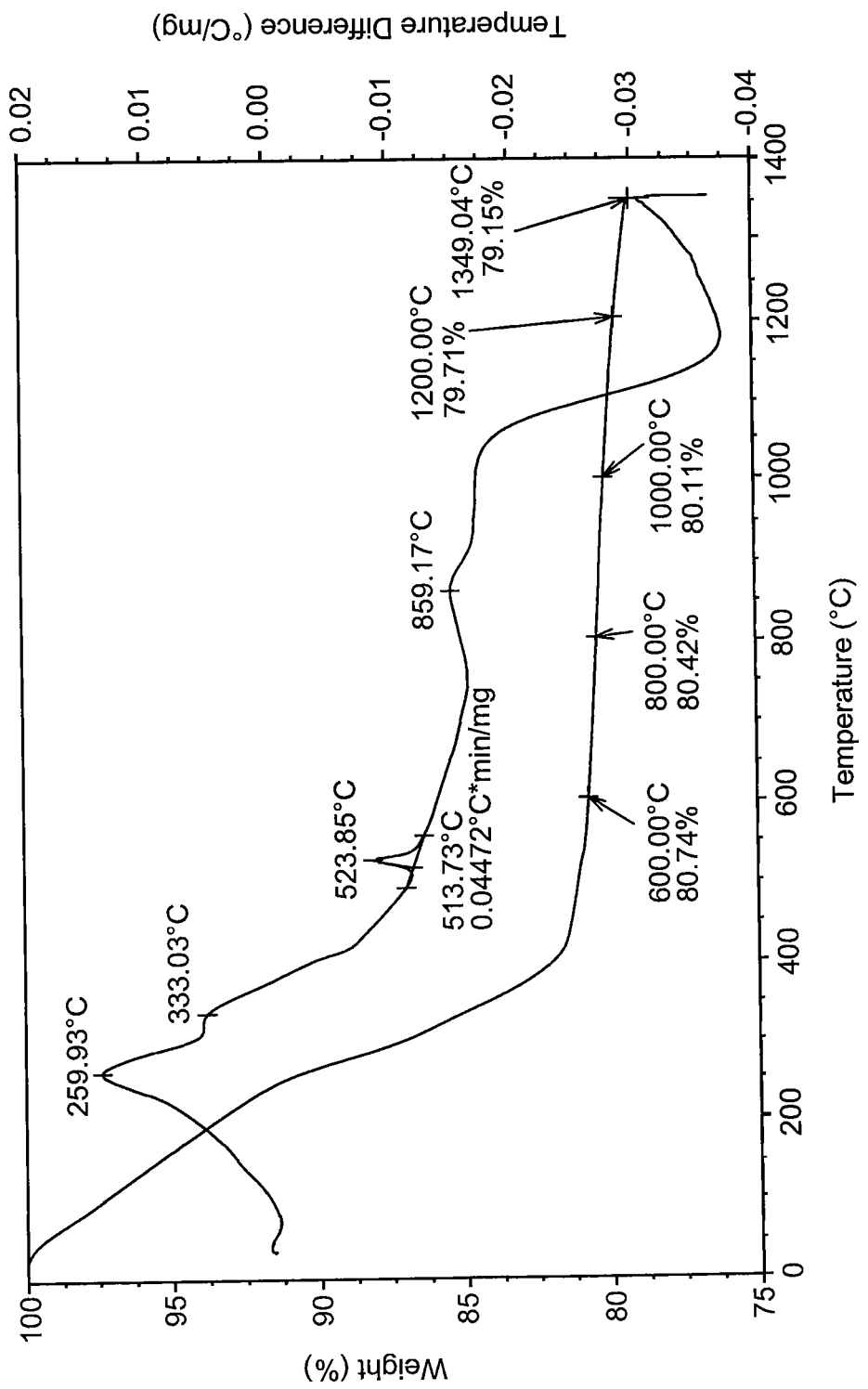
FIG. 8 shows a differential scanning calorimetry analytical plot.

In an optimized washing and sintering procedure for $HfO_2$—$Y_2O_3$ spheres, the spheres are washed with deionized water until the pH of the wash solution is <7. The spheres are then washed with five separate portions of Dowanol PM glycol ether for 30 minutes per wash. Alternatively, the spheres are washed 4 times for 5 minutes each, and then once for 30 minutes. Alternatively, the spheres can be washed with isopropyl alcohol (IPA). To sinter, the procedure in Example 8 is followed except that the spheres are sintered at 1350° Celsius in a flowing stream of oxygen atmosphere for 5 hours, rather than at 1046° Celsius for 4 hours. The resulting sintered spheres do not develop cracks and have crush strengths of >1200 g. FIG. 7 shows a microscopic image of sintered $HfO_2$—$Y_2O_3$ microspheres. FIG. 8 shows a differential scanning calorimetry analytical plot for a 29.8890 mg sample of Dowanol PM glycol ether washed HfO$_2$—Y$_2$O$_3$ gel spheres. The gel spheres were dried at 60° Celsius and were then heated in the DSC/DTA furnace at a rate of 60° Celsius per hour to a temperature of 1350° Celsius.

To produce very high density microspheres, the spheres may be sintered under air at 1500° Celsius. Such spheres could be used, for example, as abrasion resistant microspheres for grinding other materials.

Example 10

Hafnium Monohydrogen Phosphate Spheres

Hafnium monohydrogen phosphate spheres can be prepared according to the following procedure. Hydrous hafnium oxide gel spheres are placed in a fleaker with 0.5 M H$_3$PO$_4$ and soaked for 10 minutes. This step converts the surface of the spheres to hafnium monohydrogen phosphate and prevents dissolution of the spheres. The monohydrogen phosphate is insoluble in strong acid. The solution is poured off and the spheres are covered with fresh 0.5 M H$_3$PO$_4$ and soaked for 24 hours at ambient temperature. This step adds depth to the monohydrogen phosphate layer. The solution is then poured off and the spheres are covered with 6.0 M H$_3$PO$_4$. The fleaker is then placed in a stainless steel pressure vessel and deionized water is added to the vessel but outside the fleaker. The vessel is sealed and placed in an oven. The vessel is heated to 125° Celsius and maintained at that temperature for 3 hours. The temperatures are based on a thermocouple in the thermowell of the vessel. After heating, the vessel is removed from the oven and placed in an ice bath to quickly cool the vessel. Once the temperature reaches 25° Celsius, the vessel is carefully opened and the fleaker removed. The liquid is poured off of the spheres and the spheres are washed with deionized water until the pH of the washings is >3. Preferred spheres are crystalline white and can be air dried and used as sorbents.

In separate conversions using the above procedure, it was found that hafnium monohydrogen phosphate spheres prepared with 5 M H$_3$PO$_4$ were amorphous or glassy in appearance. Spheres converted with 5.25 M H$_3$PO$_4$, 5.50 M H$_3$PO$_4$, and 5.75 M H$_3$PO$_4$ were about 90, 95, and 99% converted to the white crystalline form, respectively. None of the spheres, including the 6.0 M H$_3$PO$_4$ treated spheres, degraded when soaked in 8 M HNO$_3$ for 24 hours.

Formulations and methods of forming hydrous hafnium oxide gels have been disclosed. The characteristics of the gels may be controlled to provide a gel which is useful for a variety of different applications, such as in inorganic ion exchange applications.

While various embodiments of the present disclosure of formulations and methods for preparing hydrous hafnium oxide gels have been described, it will be apparent to those of ordinary skill in the art that many more embodiments and implementations are possible within the scope of the invention. Accordingly, the presently disclosed formulations and methods are not to be restricted except in light of the attached claims and their equivalents.

What is claimed is:

1. A formulation for preparing gels, the formulation consisting essentially of:
a hafnium metal salt;
a source of hydrogen ions, the source being hydrochloric acid;
hexamethylenetetramine as an organic base; and
a complexing agent, the complexing agent being urea;
wherein a mole ratio of the organic base to the hafnium ranges from about 1.2 to about 3.

2. The formulation of claim 1, wherein a mole ratio of the organic base to the hydrogen ions from the acid is at least about 1.

3. The formulation of claim 2, wherein the mole ratio of the organic base to the hydrogen ions from the acid ranges from about 1 to about 5.

4. The formulation of claim 1, wherein a concentration of the hafnium ranges from about 0.4 M to about 0.8 M.

5. The formulation of claim 1, wherein a concentration of the hydrogen ions from the acid ranges from about 0.2 M to about 0.8 M.

6. The formulation of claim 1, wherein a concentration of the organic base ranges from about 0.6 M to about 1.6 M.

7. The formulation of claim 1, wherein a mole ratio of the organic base to the complexing agent is about 1.

8. The formulation of claim 1, wherein the metal salt comprises hafnium tetrachloride.

9. The formulation of claim 1, wherein a mole ratio of the organic base to the hydrogen ions from the acid is at least about 1, a concentration of the hafnium ranges from about 0.4 M to about 0.8 M, a concentration of the hydrogen ions from the acid ranges from about 0.2 M to about 0.8 M, a concentration of the organic base ranges from about 0.6 M to about 1.6 M, and a mole ratio of the organic base to the complexing agent is about 1.

10. The formulation of claim 9, wherein the metal salt comprises hafnium tetrachloride.

11. The formulation of claim 9, wherein the mole ratio of the organic base to the hafnium ranges from about 1.2 to about 3, and the mole ratio of the organic base to the hydrogen ions from the acid ranges from about 1 to about 5.

12. The formulation of claim 11, wherein the metal salt comprises hafnium tetrachloride.

13. A formulation for preparing gels, the formulation consisting essentially of:
a hafnium metal salt;
a source of hydrogen ions, the source being hydrochloric acid;
hexamethylenetetramine as an organic base; and
a complexing agent, the complexing agent being urea;
wherein a concentration of the hafnium ranges from about 0.4 M to about 0.8 M.

14. The formulation of claim 13, wherein a concentration of the organic base ranges from about 0.6 M to about 1.6 M.

15. The formulation of claim 13, wherein a concentration of the hydrogen ions from the acid ranges from about 0.2 M to about 0.8 M.

16. A method of preparing gels comprising hydrous hafnium oxide, the method comprising heating a volume of a formulation to a temperature sufficient to induce gel formation, wherein the formulation consists essentially of:
a hafnium metal salt;
a source of hydrogen ions, the source being hydrochloric acid;
hexamethylenetetramine as an organic base; and
a complexing agent, the complexing agent being urea;
wherein a mole ratio of the organic base to the hafnium ranges from about 1.2 to about 3.

17. The method of claim 16, wherein the volume of the formulation is heated to a temperature of greater than 60° Celsius.

18. The method of claim 17, wherein the volume of the formulation is heated to a temperature of about 70° Celsius to about 90° Celsius.

19. A spherule comprising hafnium oxide, the spherule formed by sintering a gel prepared by the method of claim 16.

* * * * *